US011466976B2

(12) United States Patent
Quaedackers (10) Patent No.: US 11,466,976 B2
(45) Date of Patent: Oct. 11, 2022

(54) METHOD AND SYSTEM FOR MEASURING A HEIGHT MAP OF A SURFACE OF AN OBJECT, AND COMPUTER PROGRAM THEREFOR

(71) Applicant: MITUTOYO CORPORATION, Kanagawa (JP)

(72) Inventor: Johannes Anna Quaedackers, Veldhoven (NL)

(73) Assignee: MITUTOYO CORPORATION, Kanagawa (JP)

(*) Notice: Subject to any disclaimer, the term of this patent is extended or adjusted under 35 U.S.C. 154(b) by 941 days.

(21) Appl. No.: 16/247,765

(22) Filed: Jan. 15, 2019

(65) Prior Publication Data

US 2019/0219380 A1 Jul. 18, 2019

(30) Foreign Application Priority Data

Jan. 15, 2018 (EP) .................... 18151625

(51) Int. Cl.
| | |
|---|---|
| *G01B 11/02* | (2006.01) |
| *G01B 9/02* | (2022.01) |
| *G06T 15/00* | (2011.01) |
| *G06V 10/10* | (2022.01) |
| *G06V 30/19* | (2022.01) |

(Continued)

(52) U.S. Cl.
CPC .......... *G01B 11/02* (2013.01); *G01B 9/02085* (2013.01); *G06T 3/4038* (2013.01); *G06T 5/001* (2013.01); *G06T 5/50* (2013.01); *G06T 15/00* (2013.01); *G06V 10/16* (2022.01); *G06V 30/1916* (2022.01); *G01B 2210/52* (2013.01); *G06T 2200/04* (2013.01); *G06T 2207/20224* (2013.01); *G06V 2201/00* (2022.01); *G06V 2201/12* (2022.01)

(58) Field of Classification Search
CPC .......................... G01B 11/02; G01B 9/02085; G01B 2210/52; G01B 11/0608; G01B 11/24; G06T 3/4038; G06T 5/001; G06T 5/50; G06T 15/00; G06T 2200/04; G06T 2207/20224; G06V 10/16; G06V 30/1916; G06V 2201/00; G06V 2201/12
See application file for complete search history.

(56) References Cited

U.S. PATENT DOCUMENTS

| | | |
|---|---|---|
| 5,343,410 A | 8/1994 | Tsujiushi et al. |
| 5,987,189 A | 11/1999 | Schmucker et al. |

(Continued)

*Primary Examiner* — Jianxun Yang
(74) *Attorney, Agent, or Firm* — Greenblum & Bernstein, P.L.C.

(57) ABSTRACT

In a method and system for measuring a height map of a surface of an object, the following steps are carried out. Height maps of different sections of the surface of the object are measured, using an optical profilometer having a field of view covering an individual section, wherein each height map comprises height data. The measured height maps are grouped into different sets of height maps, wherein within each set each one of the height maps of the set has a valid overlap to at least one other height map of the set, and wherein each height map belongs to one set and does not have a valid overlap with any height map of another set. Within each set, the measured height maps are stitched to a sub-composite stitched height map. The sub-composite stitched height maps are combined to a composite height map.

22 Claims, 9 Drawing Sheets

(51) Int. Cl.
G06T 3/40 (2006.01)
G06T 5/00 (2006.01)
G06T 5/50 (2006.01)

(56) References Cited

U.S. PATENT DOCUMENTS

| | | | |
|---|---|---|---|
| 5,991,461 A | 11/1999 | Schmucker et al. | |
| 6,611,791 B1* | 8/2003 | Kase | G01B 11/24 |
| | | | 702/167 |
| 9,881,400 B2 | 1/2018 | Zuiderweg et al. | |
| 2015/0362309 A1 | 12/2015 | Quaedackers | |
| 2016/0027194 A1* | 1/2016 | Zuiderweg | G01B 11/2441 |
| | | | 356/601 |
| 2017/0052018 A1 | 2/2017 | Quaedackers et al. | |
| 2018/0315207 A1 | 11/2018 | Quaedackers | |

* cited by examiner

METHOD AND SYSTEM FOR MEASURING A HEIGHT MAP OF A SURFACE OF AN OBJECT, AND COMPUTER PROGRAM THEREFOR

CROSS-REFERENCE TO RELATED APPLICATIONS

The present application claims priority under 35 U.S.C. § 119 of European Application No. 18151625.3, filed on Jan. 15, 2018, the disclosure of which is expressly incorporated by reference herein in its entirety.

BACKGROUND OF THE INVENTION

1. Field of the Invention

The invention relates to the field of measuring a height map of a surface of an object, and more specifically to a method and system for measuring such a height map an optical profilometer in 2.5D or 3D optical metrology imaging, or optical profiling, including: White Light Interferometry, Structured Illumination Microscopy, Points From Focus/Shape From Focus Sensing, Confocal Microscopy, Chromatic Point Sensor Array Sensing, Phase Shifting Interferometry, Laser Interferometer Microscopy, and the like.

(a) Description of Related Art

When using a 2.5D or 3D optical metrology imaging system to measure a height map of a surface of an object, the field of view, FOV, is limited. Thus, only a limited area of the surface of the object can be measured at one time. In order to measure areas larger than one field of view, multiple measurements at multiple locations on the sample have to be combined.

A common method to combine multiple fields of view is the use of stitching algorithms. Assuming that measured height maps overlap in overlapping areas, in stitching algorithms the offsets in the overlapping areas of the height maps are minimized by a combination of rotations and shifts of the individual height maps. Most commonly this is done using a least square minimization of an error function. Stitching algorithms and methods are well known as such, and have been extensively described in, for example, U.S. Pat. Nos. 5,343,410 A, 5,991,461 A, 5,987,189 A.

A problem exists in that missing or erroneous data in the overlapping areas may cause critical failures in the stitching algorithms. As an example, optical 2.5D surface metrology methods will not be able to cope with large steps (shadows), holes, steep slopes, or local low reflectivity areas. For some objects, it is therefore inevitable that gaps in the data occur.

In view of this, current stitching algorithms and methods will fail if one height map or a group of height maps are disconnected from (that is, have no valid overlap with) the remainder of the height maps of the object.

There is a need for improvement of this situation.

SUMMARY OF THE INVENTION

It would be desirable to provide an improved, or alternative method and corresponding system for measuring a height map of a surface of an object. It would also be desirable to provide an improved, or alternative method and corresponding system for measuring a height map of a surface of an object wherein one or more individual height maps or groups of height maps of respective fields of view have no valid overlap with one or more other individual height maps or other groups of height maps.

To better address one or more of these concerns, in a first aspect of the invention a method of measuring a height map of a surface of an object is provided. This method includes:

measuring height maps of different sections of the surface of the object, using an optical profilometer having a field of view (FOV) covering an individual section, wherein each height map includes height data;

grouping the measured height maps into different sets or groups of height maps, wherein within each set each one of the height maps of the set has a valid overlap to at least one other height map of the set, and wherein each height map belongs to one set and does not have a valid overlap with any height map of another set;

stitching, within each set, the measured height maps to a sub-composite stitched height map.

The solution according to the invention allows to prevent a stitching failure in case a measured height map of a section of the surface of an object is not connected, through (valid) overlaps of other measured height maps, to a further measured height map. According to the invention, for a first measured height map, it is investigated whether there are any other measured height maps overlapping the first measured height map, and any further measured height maps overlapping said other measured height maps overlapping the first measured height map. The measured height maps showing such overlap are grouped in a set until no more additional measured height map can be found to have an overlap with any measured height map of the set. For the remaining measured height maps, if any, this process is started anew to form one or more further sets of measured height maps, until there are no more remaining measured height maps. In the process, a set of measured height maps may include a single measured height map. After the process, each measured height map belonging to one set of measured height maps does not have a valid overlap with any measured height map of any other set of measured height maps. Thus, the sets of measured height maps define separate parts of the surface of the object. It is assumed here that at least two sets of measured height maps are identified.

Then, within each set of measured height maps, the height maps are stitched to a sub-composite stitched height map. Within each set of height maps, each height map, through overlaps of other height maps, is connected to any other height map of the same set of height maps, so that a stitching failure does not occur within each set of height maps when constructing the sub-composite stitched height map.

In a feature, the measuring method further includes, after the stitching step for each set of measured height maps, combining the sub-composite stitched height maps to a composite height map.

This combining step may be performed based on the absolute coordinate data of the height maps in the associated coordinate system, for example a Cartesian X, Y, Z coordinate system or any other appropriate coordinate system. This stitching will reduce any errors in Z (the height coordinate) by averaging Z values of the sub-composite stitched height maps.

In a feature of the measuring method, the step of grouping the measured height maps into different sets of height maps includes minimizing the number of sets.

Since a composite height map is made in a two-step approach as explained above, namely first grouping the measured height maps into different sets of height maps to obtain sub-composite stitched height maps, and then combining the sub-composite stitched height maps to a composite height map, a processing time to determine the composite height map may be minimized by minimizing the number of sets of grouped height maps.

In a feature of the measuring method, the step of grouping the measured height maps into different sets of height maps includes the steps of:

(b) indexing all measured height maps by associating each measured height map with an index;

(c) generating, for each one of the measured height maps, a list of indices associated with other measured height maps sharing a valid overlap with said each one of the height maps;

(d) selecting a measured height map;

(e) comparing each index of the list of indices of the selected measured height map with the indices of the lists of indices of all other measured height maps;

(f) if a match between one of the indices of the list of indices of the selected measured height map and one or the indices of a list of indices of another measured height map is found, then merging the list of indices of said other measured height map with the list of indices of the selected measured height map, and discarding the list of indices of said other measured height map;

(g) searching, in the merged list of indices, an index occurring more than once;

(h) if an index occurring more than once is identified in the merged list of indices, then retaining one occurrence of the index in the merged list of indices and discarding all other occurrences of the index from the merged list of indices to obtain a condensed merged list of indices; and (i) repeating steps (c) to (g) for all remaining measured height maps, wherein each remaining list of indices represents one of the sets of height maps.

Following the above steps (a) to (h) by an algorithm programmed as computer instructions running in a processor of a computer system will result in sets of height maps being formed, and being defined by respective lists of indices of height maps. The above steps (a) to (h) will further have the result that the number of sets of height maps thus formed is kept to a minimum.

In the grouping of the measured height maps into different sets of height maps to obtain sub-composite stitched height maps, overlapping height maps are to be identified. When identified, in a first case there may be only height offsets between overlapping height maps. In a second case, there may be height offsets and tilt errors between overlapping height maps. In both cases, the overlap needs to be valid in order to perform the grouping. To determine the validity of the overlap of height maps, different approaches are used for each case.

Referring to the first case, in a feature of the measuring method, each section includes grid positions, wherein each height map includes height data at the grid positions of the corresponding section, and wherein, if only a height offset between overlapping height maps is to be corrected by the stitching of the height maps within each set to a sub-composite stitched height map, a valid overlap occurs if at at least one grid position common to the overlapping height maps valid height data exist in each one of the overlapping height maps.

Referring to the second case, in a feature of the measuring method, each section includes grid positions, wherein each height map includes height data at the grid positions of the corresponding section, and wherein, if a height offset and tilt errors between overlapping height maps are to be corrected by the stitching of the height maps within each set to a sub-composite stitched height map, a valid overlap occurs if at at least three different grid positions common to the overlapping height maps valid height data exist in each one of the overlapping height maps.

In a feature of the measuring method, height offsets between sub-composite stitched height maps are compensated based on at least one pre-scan or post-scan height map.

A pre-scan height map may include Computer Aided Design (CAD) data, such as data defining relative spatial positions of parts of the object.

A pre-scan or post-scan height map may include height data measured by a sensor. The sensor may be an optical sensor having a FOV which is larger than a gap between sub-composite stitched height maps. Thus, the height data measured by the sensor may provide reference data for combining the sub-composite stitched height maps to a composite height map. In another embodiment, the sensor is a tactile sensor configured for contacting each section of the surface of the object at least at one location. A height of each of the different locations thus contacted by the tactile sensor is associated with respective height data of the sub-composite stitched height maps, whereafter all height data that have been obtained can be correlated to compensate height offsets between sub-composite stitched height maps.

In a feature of the measuring method, height offsets between sub-composite stitched height maps are compensated based on temperature drift model data to estimate drift based on a (possibly varying) environment temperature.

In a feature of the measuring method, wherein pre-scan or post-scan height data (data points) are available, the measuring method further includes:

computing data points of the pre-scan or post-scan height map that have an overlap (that is, being in a surface area of overlap) to each of the sub-composite stitched height maps;

computing a first mean of height data of each sub-composite stitched height map;

computing a second mean of the corresponding overlapping height data (that is, the height data in the surface area of overlap) in the pre-scan or post-scan height map;

computing an offset of each sub-composite stitched height map by subtracting the first mean from the second mean;

subtracting, for each sub-composite stitched height map, its corresponding offset from the height data of the sub-composite stitched height map before combining the sub-composite stitched height maps to a composite height map.

In an alternative embodiment of the measuring method, wherein pre-scan or post-scan height data (data points) are available, the measuring method further includes:

interpolating data points of the sub-composite stitched height maps to grid positions of the pre-scan or post-scan height map;

computing data points of the pre-scan or post-scan height map that have an overlap (that is, being in a surface area of overlap) to each of the interpolated sub-composite stitched height maps;

computing a first mean of height data of each interpolated sub-composite stitched height map;

computing a second mean of the corresponding overlapping height data (that is, the height data in the surface area of overlap) in the pre-scan or post-scan height map;

computing an offset of each interpolated sub-composite stitched height map by subtracting the first mean from the second mean;

subtracting, for each sub-composite stitched height map or interpolated sub-composite stitched height map, its corresponding offset from the height data of the sub-composite stitched height map or interpolated sub-composite stitched height map before combining the sub-composite stitched height maps or interpolated sub-composite stitched height maps to a composite height map.

In a feature of the latter two embodiments of the measuring method, the offset subtracting is performed only when a value based on at least one of the number of fields of view in each set of height maps, the data density in one FOV, and a point-to-point uncertainty, is larger than a predetermined threshold. The threshold serves to show a likelihood of improving the height calculation result by the offset calculating and subtracting.

In a feature, the measuring method further includes, if the absolute height data of the surface are lost, restoring the absolute height data of the surface by:
  fitting a first plane to the sub-composite stitched height maps;
  subtracting the first fitted plane from the sub-composite stitched height maps;
  fitting a second plane to corresponding measured height data; and
  adding the second fitted plane to the sub-composite stitched height maps.

The corresponding measured height data may be a pre-scan or post-scan height map including height data measured by a sensor. As noted above, the sensor may be an optical sensor or a tactile sensor, for example.

In a feature of the latter variant of the measuring method, the step of fitting the first plane involves using a subset of the measured height data, to reduce a calculation effort while retaining excellent results. The subset may include height data at a centre of the fields of view. Alternatively, the step of fitting the first plane may involve using a mean per corresponding fields of view.

In a feature, the measuring method further includes the step of establishing a common grid for an individual section, for a set of height maps, for a sub-composite stitched height map, for a composite height map, or for the surface, by:
  calculating an average pixel size in X and Y directions;
  calculating an average FOV size in X and Y directions;
  calculating an average field step size in X and Y directions from the average pixel size and the average FOV size;
  generating a common X-Y grid for interpolation of all height data.

In a feature of the latter variant of the measuring method, the field step size may be variable, in particular pseudo-random.

In a second aspect, the invention provides a system for measuring a height map of a surface area of an object. The system includes:
  a memory storing height data of measured height maps of different sections of the surface of the object; and
  a processing unit configured for:
  i. retrieving the height data of the measured height maps from the memory;
  ii. grouping the measured height maps into different sets of height maps, wherein within each set each one of the height maps of the set has a valid overlap to at least one other height map of the set, and wherein each height map belongs to one set and does not have a valid overlap with any height map of another set; and
  iii. stitching, within each set, the measured height maps to a sub-composite stitched height map.

In a feature, the measuring system further includes:
  at least one optical profilometer having a field of view (FOV), the profilometer being configured for measuring height maps of different sections of the surface of the object, the FOV covering an individual section, wherein each height map includes height data.

In a feature of the measuring system, the processing unit further is configured for:
  combining the sub-composite stitched height maps to a composite height map.

In a feature of the measuring system, the processing unit, for grouping the measured height maps into different sets of height maps, further is configured for:
  (j) indexing all measured height maps by associating each measured height map with an index;
  (k) generating, for each one of the measured height maps, a list of indices associated with other measured height maps sharing a valid overlap with said each one of the height maps;
  (l) selecting a measured height map;
  (m) comparing each index of the list of indices of the selected measured height map with the indices of the lists of indices of all other measured height maps;
  (n) if a match between one of the indices of the list of indices of the selected measured height map and one or the indices of a list of indices of another measured height map is found, then merging the list of indices of said other measured height map with the list of indices of the selected measured height map, and discarding the list of indices of said other measured height map;
  (o) searching, in the merged list of indices, an index occurring more than once;
  (p) if an index occurring more than once is identified in the merged list of indices, then retaining one occurrence of the index in the merged list of indices and discarding all other occurrences of the index from the merged list of indices to obtain a condensed merged list of indices; and
  (q) repeating steps (c) to (g) for all remaining measured height maps,
wherein each remaining list of indices represents one of the sets of height maps.

In a feature of the measuring system, the processing unit further is configured for outputting calculated height data to at least:
  a display device for displaying each sub-composite stitched height map;
  a memory device for storing the height data of the sub-composite stitched height map; and/or
  a printing device for printing each sub-composite stitched height map.

In a feature of the measuring method of the first aspect of the invention, or the measuring system of the second aspect of the invention, the optical profilometer is selected from a group of optical profilometers including a white-light interferometer, WLI, a phase-shifting interferometer, PSI, an array of chromatic point sensors, CPSs, a points-from-focus/shape-from-focus, PFF/SFF, sensor, a confocal microscope, a structured illumination microscope, SIM, and a laser interferometer microscope, LIM.

In a third aspect, the present invention provides a computer program including computer instructions to cause a processing unit having the computer instructions loaded into it, to perform the grouping step of the method according to the first aspect of the invention.

In a fourth aspect, the present invention provides a data carrier, in particular a non-volatile data carrier, storing computer instructions to cause a processing unit having the computer instructions loaded into it, to perform the grouping step of the method according to the first aspect of the invention.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

The particulars shown herein are by way of example and for purposes of illustrative discussion of the includes of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1A:
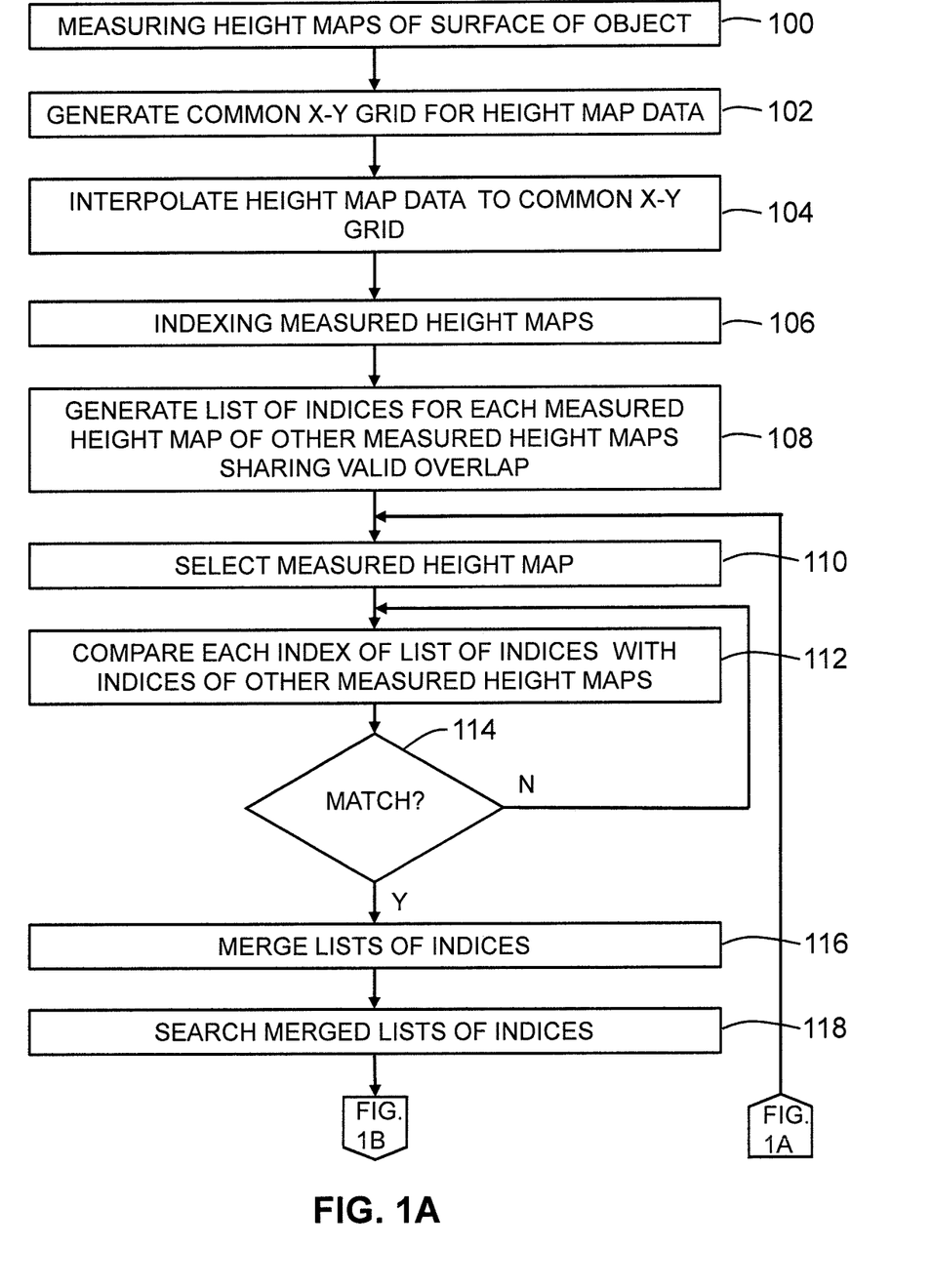
FIGS. 1A and 1B in combination depict a flow diagram of embodiments of a method according to the present invention for measuring a height map of a surface of an object.
Figure 1B:
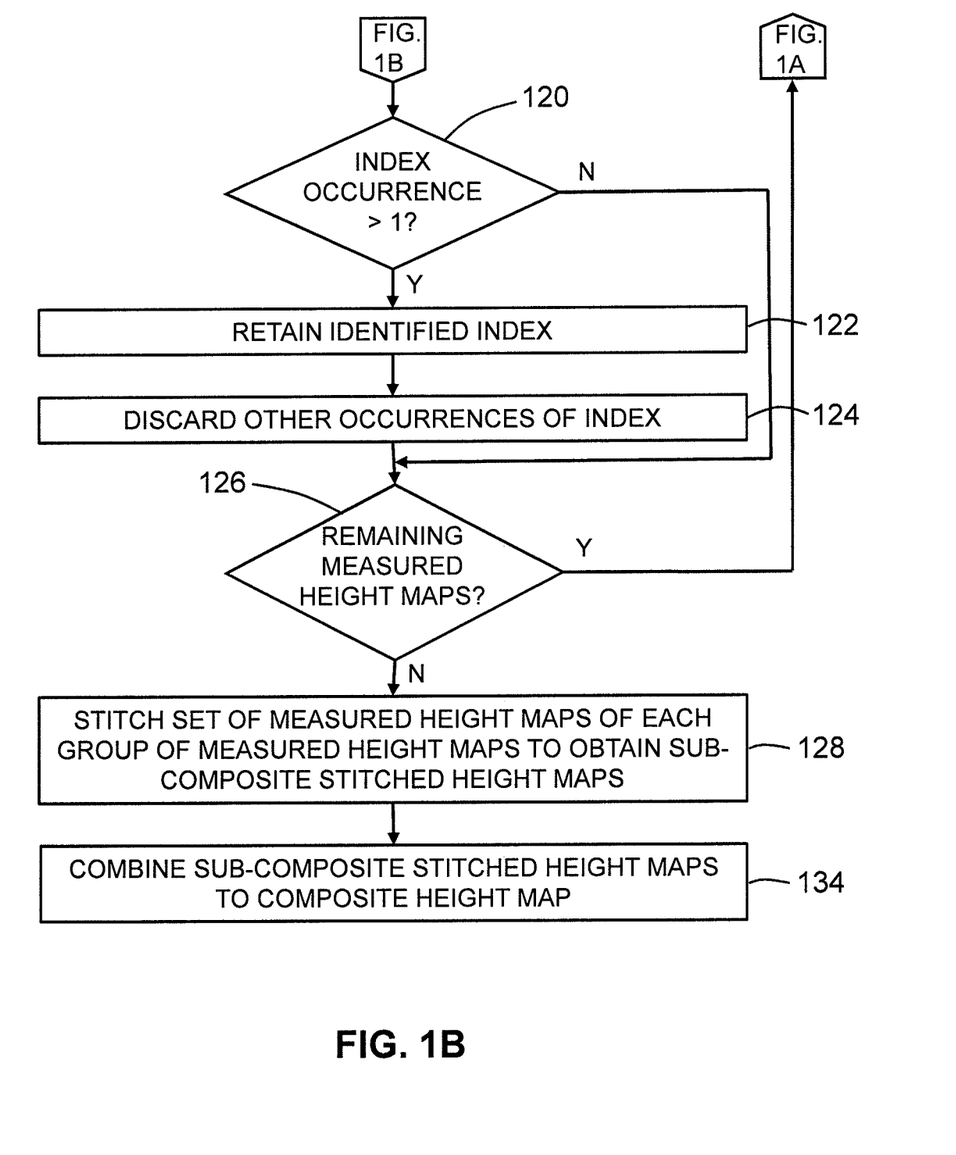

Referring to the drawings wherein like characters represent like elements, FIGS. 1A and 1B in combination depict a flow diagram of embodiments of a method according to the present invention for measuring a height map of a surface of an object.

In the method, as a preparatory step, as indicated by block 100, height maps of different sections of the surface of the object are measured, using an optical profilometer having a field of view (FOV) covering an individual section. Methods to obtain such height maps are well-known in the art, and are not discussed in detail herein. It is assumed here that the surface area of each height map overlaps with the surface area of one or more other height maps, as explained in more detail by reference to FIG. 3. In other words, the surface area of each section of the surface overlaps with the surface area of one or more other sections.

As a result of the preparatory step, height map data of the measured height map become available for each section. Such height map data may include, for each measured height map, as seen in a Cartesian coordinate system having mutually orthogonal X, Y and Z axes, a collection of points each having an X, Y and Z coordinate, wherein the Z coordinate indicates a height value.

As indicated by block 102, measured height map data from multiple, or all, height maps may be used to determine an average pixel size in both X and Y axis directions, an average field size (or section size, in X and Y directions, and an average field step size, or section step size, in X and Y directions. These values (average pixel size, average field size, and average field step size) may be used to generate a common X-Y grid to which the height map data may be interpolated.

Subsequently, in a next step, as indicated by block 104, the height map data of the measured height maps are interpolated to the common X-Y grid.

The height map data and/or interpolated height map data may be stored in a non-volatile computer memory, and may be retrieved by a computer processing system for the height map data and/or interpolated height map data to be processed. Height map data and/or interpolated height map data for measured height maps that do not contain valid data, may be removed from the memory to save memory space and to reduce computation time.

The steps taken as indicated by blocks 100, 102 and 104 are known from existing height map stitching methods.

Next, according to the invention, the measured height maps are grouped into different sets of height maps, wherein within each set each one of the height maps of the set has a valid overlap to at least one other height map of the set, and wherein each height map belongs to one set and does not have a valid overlap with any height map of another set. A set of grouped measured height maps can be stitched to form a sub-composite stitched height map.

For this grouping process, the following steps are carried out.

As indicated in block 106, all measured height maps are indexed by associating each measured height map with an index.

In a next step, as indicated in block 108, for each one of the measured height maps, a list of indices associated with other measured height maps sharing a valid overlap with said each one of the height maps is generated.

As noted above, each section includes grid positions, and each height map includes height data at the grid positions of the corresponding section.

If only a height offset between overlapping height maps is to be corrected by the stitching of the height maps within each set to a sub-composite stitched height map, a valid overlap occurs if at at least one grid position common to the overlapping height maps valid height data exist in each one of the overlapping height maps. The valid height data of the different height maps may be the same, or may be different at the at least one grid position.

If a height offset and tilt errors between overlapping height maps are to be corrected by the stitching of the height maps within each set to a sub-composite stitched height map, a valid overlap occurs if at at least three different grid positions common to the overlapping height maps valid height data exist in each one of the overlapping height maps. The valid height data of the different height maps may be the same, or may be different at the at least one grid position.

If the size of the overlap between height maps is smaller than half a lateral size of the height maps, only directly neighbouring height maps can have a valid overlap. By limiting a check for a valid overlap to directly neighbouring height maps only, a search time for finding validly overlapping height maps can be substantially reduced.

After the generation of the lists of indices according to block 108, in a next step as indicated by block 110, a measured height map is selected.

Then, in a next step as indicated by block 112, each index of the list of indices of the selected measured height map is compared with the indices of the lists of indices of all other measured height maps.

In the comparison step, a decision step is taken. In the decision step, as indicated by diamond 114, if a match between one of the indices of the list of indices of the selected measured height map and one or the indices of a list of indices of another measured height map is found (path Y), then the list of indices of said other measured height map is merged with the list of indices of the selected measured height map, as indicated by block 116. The list of indices of said other measured height map is discarded. If said match is not found, path N, then the method returns to the step of block 112 for a comparison of the index of the selected measured height map with the indices of a next other measured height map, if it exists.

In a next step, as indicated by block 118, the merged list of indices is searched for an index occurring more than once.

In the searching step, a decision step is taken. In the decision step, as indicated by diamond 120, if an index occurring more than once is identified in the merged list of indices, then one occurrence of the index is retained in the merged list of indices, as indicated by block 122, and all other occurrences of the index are discarded from the merged list of indices, as indicated by block 124, to obtain a condensed merged list of indices.

The steps according to blocks 110, 112, 116, 118, 122 and 124, and diamonds 114 and 120 are repeated for all remaining measured height maps, as indicated by diamond 126, path Y. If there are no more remaining measured height maps, a next step is taken, path N.

It is noted that all measured height maps are now divided into groups of measured height maps, wherein each group is represented by a list of one or more indices, and wherein the number of indices is equal to the number of measured height maps being a member of the group. All measured height maps in one group have a valid overlap to at least one other height map in the same group. As such, a successful stitching of the set of all measured height maps within any group is guaranteed.

In a next step, as indicated by block 128, the set of measured height maps of each group of measured height maps is stitched to obtain, for the group, a sub-composite stitched height map. Optionally, a quality factor may be used as a weighting factor to increase a robustness of the stitching algorithm.

(r) After the step indicated by block 128, the sub-composite stitched height maps may be combined to obtain a composite height map covering the surface of the object, as indicated by block 134.

Possible height offsets between sub-composite stitched height maps may be compensated based on at least one pre-scan or post-scan height map of the surface of the object. A pre-scan height map may include Computer Aided Design (CAD) data. A pre-scan height map may also, or alternatively, include height data measured by a sensor. Height data may also be measured by a sensor in a post-scan height map. The sensor may be an optical sensor having a field of view which is larger than a gap between the sub-composite stitched height map in a direction of interest, or a tactile sensor which in particular is configured to contact each section of the surface of the object at at least one location. Furthermore, height offsets between sub-composite stitched height maps may be compensated based on temperature drift model data to estimate drift based on environment temperature.

Figure 1C:
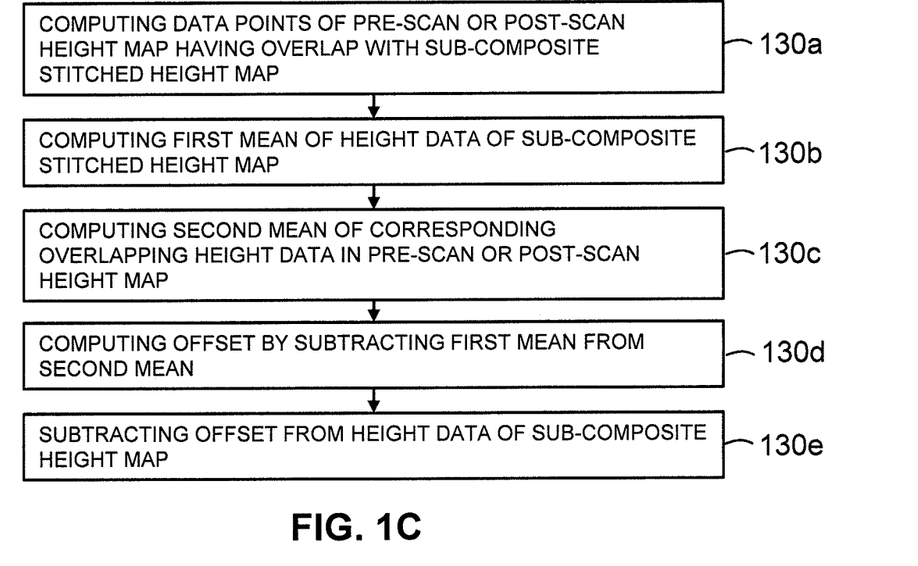
FIGS. 1C and 1D depict flow diagrams of steps of embodiments of a method according to the present invention.
Figure 1D:
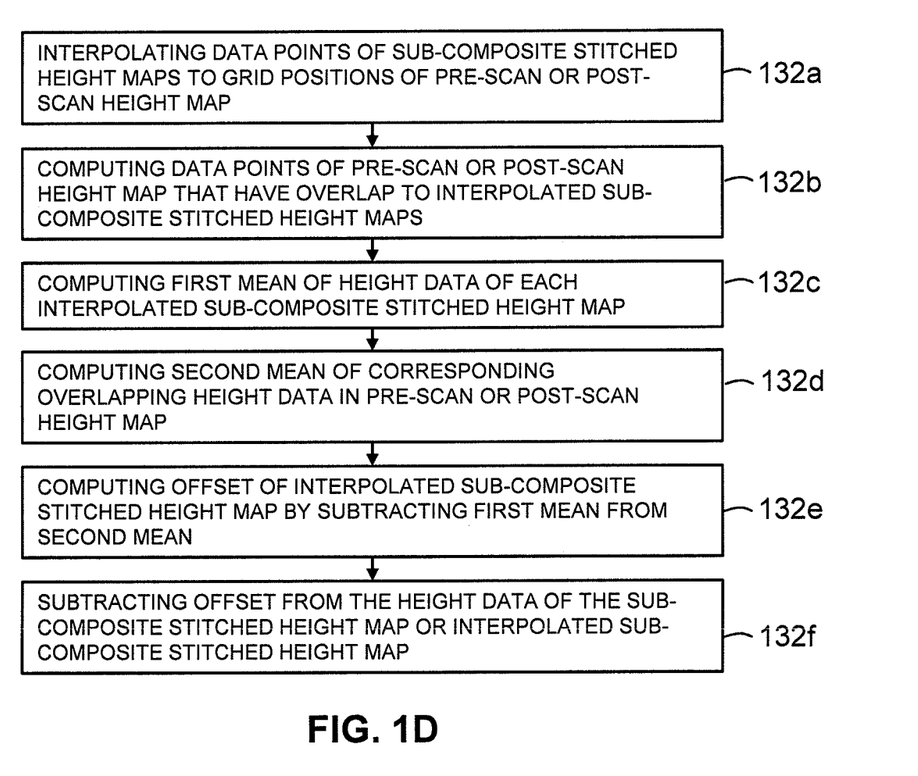

As depicted in the flow diagram of FIG. 1C and the alternative flow diagram of FIG. 1D, between the step as indicated by block 128 and the step as indicated by block 134, different offset compensation steps can be taken, based on data points of a pre-scan or post-scan height map.

With reference to FIG. 1C, after the step as indicated by block 128, data points of the pre-scan or post-scan height map that have an overlap to each of the sub-composite stitched height maps may be computed, as indicated by block 130a.

Then, as indicated by block 130b, a first mean of height data of each sub-composite stitched height map may be computed.

As a next step, as indicated by block 130c, a second mean of the corresponding overlapping height data in the pre-scan or post-scan height map may be computed.

Then, as indicated by block 130d, an offset of each sub-composite stitched height map may be computed by subtracting the first mean from the second mean and, as indicated by block 130e, for each sub-composite stitched height map, its corresponding offset may be subtracted from the height data of the sub-composite stitched height map, before combining the sub-composite stitched height maps to a composite height map according to block 134.

With reference to FIG. 1D, after the step as indicated by block 128, data points of the sub-composite stitched height maps may be interpolated to grid positions of the pre-scan or post-scan height map, as indicated by block 132a.

Then, as indicated by block 132b, data points of the pre-scan or post-scan height map that have an overlap to each of the interpolated sub-composite stitched height maps may be computed.

As a next step, as indicated by block 132c, a first mean of height data of each interpolated sub-composite stitched height map may be computed.

Then, as indicated by block 132d, a second mean of the corresponding overlapping height data in the pre-scan or post-scan height map may be computed.

As a next step, as indicated by block 132e, an offset of each interpolated sub-composite stitched height map may be computed by subtracting the first mean from the second mean and, as indicated by block 132f, for each sub-composite stitched height map or interpolated sub-composite stitched height map, its corresponding offset may be subtracted from the height data of the sub-composite stitched height map or interpolated sub-composite stitched height map before combining the sub-composite stitched height maps or interpolated sub-composite stitched height maps to a composite height map according to block 134.

Figure 1E:
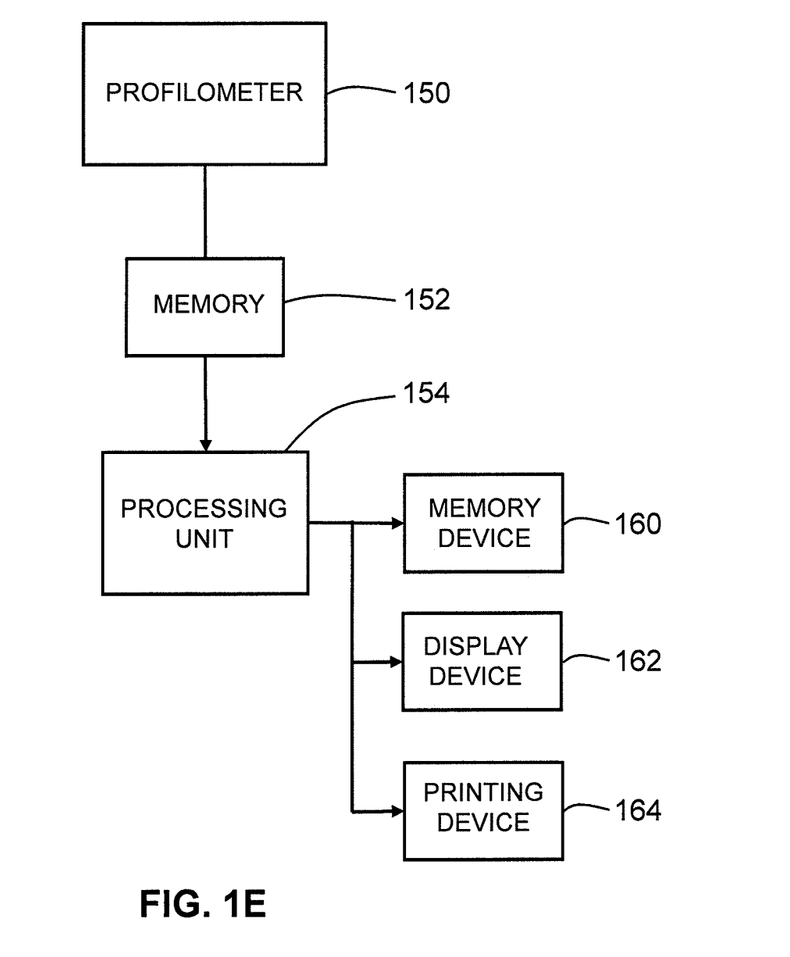
FIG. 1E depicts a block diagram of components of a system according to the present invention.

FIG. 1E depicts a block diagram of a system for measuring a height map of a surface area of an object according to the invention. The system includes at least of memory 152 storing height data of measured height maps of different sections of the surface of the object, and a processing unit 154. The height data may have been measured by at least one profilometer 150 having a field of view (FOV) and output to the memory 152. The profilometer 150 is configured for measuring height maps of different sections of the surface of the object, wherein the FOV covers an individual section, and wherein each height map includes height data.

The processing unit 154, when executing corresponding computer instructions loaded into it, is configured for:
retrieving the height data of the measured height maps from the memory;
grouping the measured height maps into different sets of height maps, wherein within each set each one of the height maps of the set has a valid overlap to at least one other height map of the set, and wherein each height map belongs to one set and does not have a valid overlap with any height map of another set; and
stitching, within each set, the measured height maps to a sub-composite stitched height map.

The processing unit 154 may be further configured for combining the sub-composite stitched height maps to a composite height map.

In particular, the processing unit 154, for grouping the measured height maps into different sets of height maps, further is configured for:
(s) indexing all measured height maps by associating each measured height map with an index;
(t) generating, for each one of the measured height maps, a list of indices associated with other measured height maps sharing a valid overlap with said each one of the height maps;
(u) selecting a measured height map;
(v) comparing each index of the list of indices of the selected measured height map with the indices of the lists of indices of all other measured height maps;
(w) if a match between one of the indices of the list of indices of the selected measured height map and one or the indices of a list of indices of another measured height map is found, then merging the list of indices of said other measured height map with the list of indices of the selected measured height map, and discarding the list of indices of said other measured height map;
(x) identifying, in the merged list of indices, an index occurring more than once;
(y) if an index occurring more than once is identified in the merged list of indices, then retaining one occurrence of the index in the merged list of indices and discarding all other occurrences of the index from the merged list of indices to obtain a condensed merged list of indices; and
(z) repeating steps (c) to (g) for all remaining measured height maps,
wherein each remaining list of indices represents one of the sets of height maps.

Computed height data may be output from the processing unit 154 to at least one of a display device 162 for displaying a height map, in particular a sub-composite stitched height map or a composite height map, a memory device 160 for storing height data of a height map, in particular a sub-composite stitched height map or a composite height map, and a printing device 164 for printing a height map, in particular a sub-composite stitched height map or a composite height map.

Figures 2, 2A:
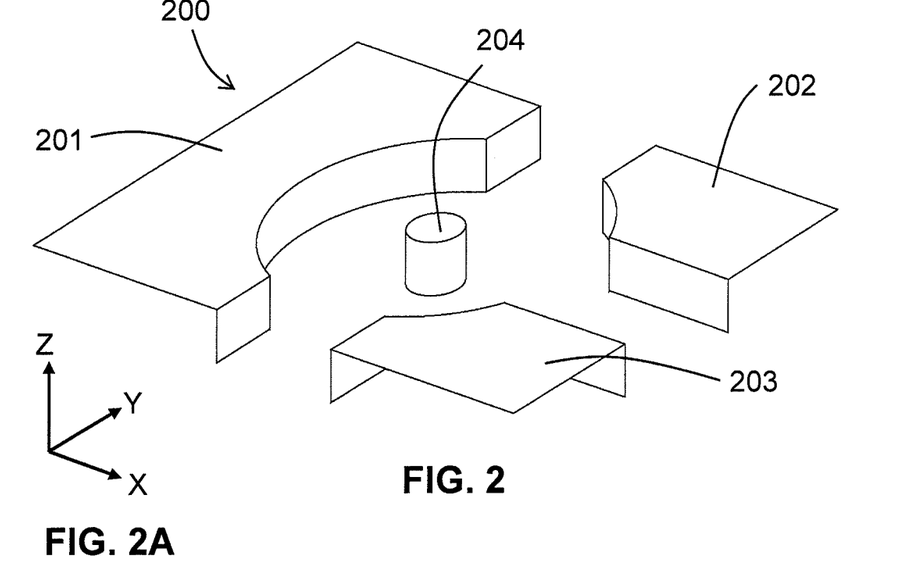
FIG. 2 depicts a perspective view of a part of an object including non-connected surface parts of which a height map is to be measured in accordance with the present invention.
FIG. 2A depicts an axis system including mutually orthogonal X, Y and Z axes for defining coordinates in the method and system of measuring the surface of the object of FIG. 2.

FIG. 2 schematically depicts a part of an object 200 having unconnected surfaces 201, 202, 203 and 204. The object 200 is associated with an orthogonal coordinate system having mutually orthogonal X, Y and Z axes as illustrated in FIG. 2A. The object 200 is presented as a mere example, and the method, system and software of the present invention are able to also process objects having more even more complex surfaces, for example being inclined, angular, or curved in Z direction. Surfaces 201, 202 and 203 are essentially rectangular and have a partly circular recess. Surface 204 is essentially circular.

Figure 3:
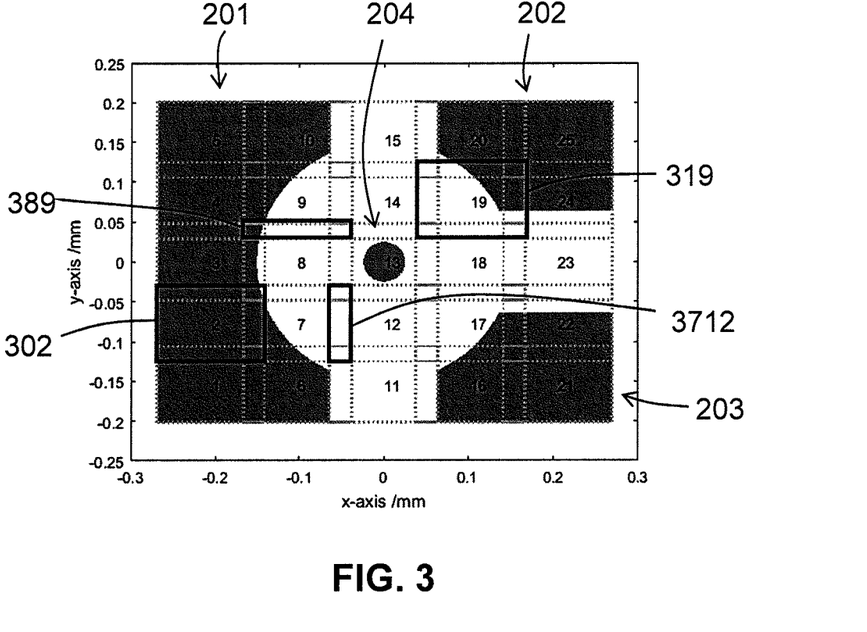
FIG. 3 depicts a top view of the surface of the object of FIG. 2, indicating some fields of view and some respective overlapping areas.

FIG. 3 shows a top view of the object 200 of FIG. 2, wherein the surfaces 201, 202, 203 and 204 are indicated by grey areas. X and Y axes [mm] are indicated. Fields of view of an optical profilometer are indicated by dashed lines, wherein each field of view, FOV, has a surface with a dimension in X direction of about 0.13 mm, and a dimension in Y direction of about 0.11 mm. For the object 200, 25 fields of view (FOV 1 to 25) are indicated. As examples, FOV 2 is indicated by rectangle 302, and FOV 19 is indicated by rectangle 319. The fields of view 1 to 25 overlap. As examples, FOV 8 overlaps with FOV 9, wherein the field of overlap is indicated by rectangle 389, and FOV 7 overlaps with FOV 12, wherein the field of overlap is indicated by rectangle 3712.

From FIG. 3, it appears that fields of view 11, 12, 14, 15, 18 and 23 do not cover any surface part of the object 200.

Figure 4:
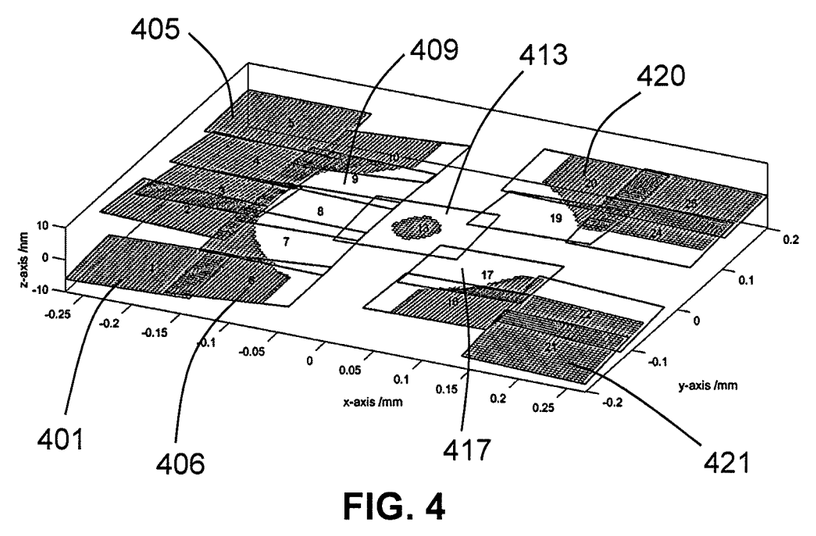
FIG. 4 illustrates height maps measured for a plurality of fields of view.

FIG. 4 illustrates, in quasi three-dimensional view, height maps as may be obtained by scanning the surface of the object 200 according to FIG. 3 with an optical profilometer, producing 25 overlapping fields of view of the surface of the object 200. As an example, for FOV 1, 6, 9, 13, 20 and 21, respective height maps 401, 406, 409, 413, 420 and 421 are obtained showing tilt and offset errors. As further example, for FOV 5 and 17, respective height maps 405, 417 are obtained showing an offset error. It can be seen that no height maps for fields of view 11, 12, 14, 15, 18 and 23 could be obtained for lack of meaningful Z coordinates in these fields of view.

Figure 5:
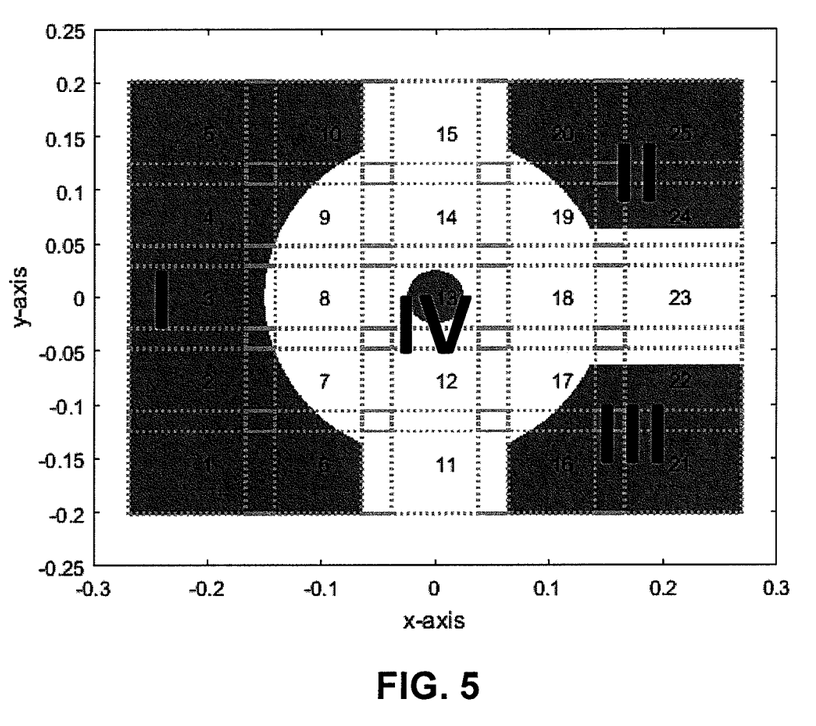
FIG. 5 illustrates a grouping of measured height maps into sets of measured height maps.

FIG. 5 shows a result of grouping the measured height maps into different sets of height maps, wherein within each set each one of the height maps of the set has a valid overlap to at least one other height map of the set, and wherein each height map belongs to one set and does not have a valid overlap with any height map of another set. A set I of measured height maps includes the height maps of fields of view 1 to 10. A set II of measured height maps includes the height maps of fields of view 19, 20, 24 and 25. A set III of measured height maps includes the height maps of fields of view 16, 17, 21 and 22. A set IV of measured height maps includes the height maps of field of view 13.

Figure 6A:
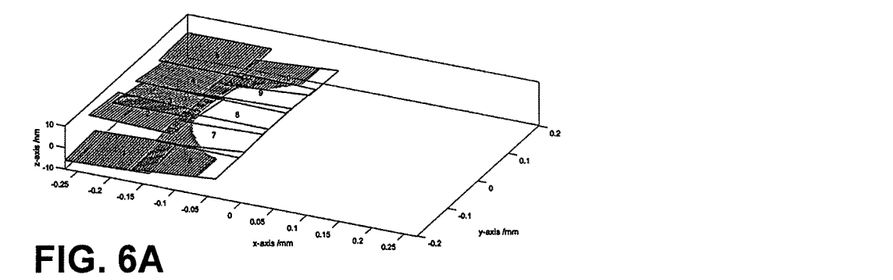
FIGS. 6A and 6B illustrate a result of stitching measured height maps to a sub-composite height map in a first set of measured height maps.
Figure 6B:
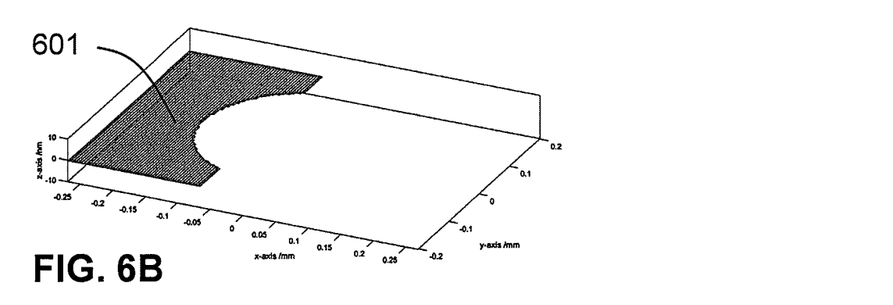
Figure 6C:
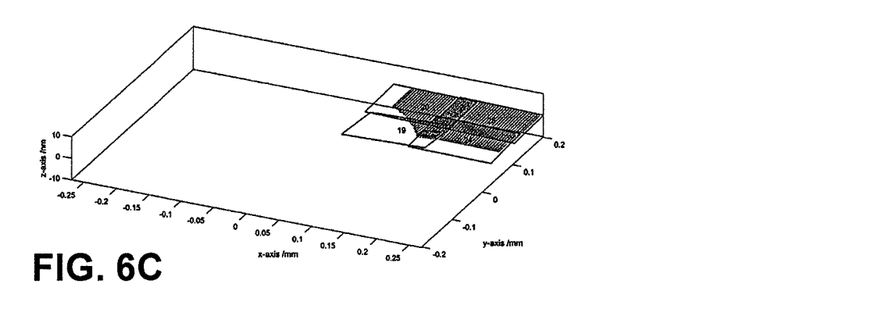
FIGS. 6C and 6D illustrate a result of stitching measured height maps to a sub-composite height map in a second set of measured height maps.
Figure 6D:
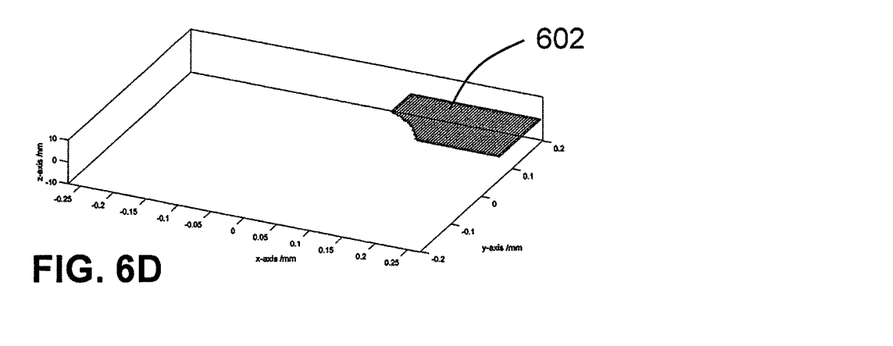
Figure 6E:
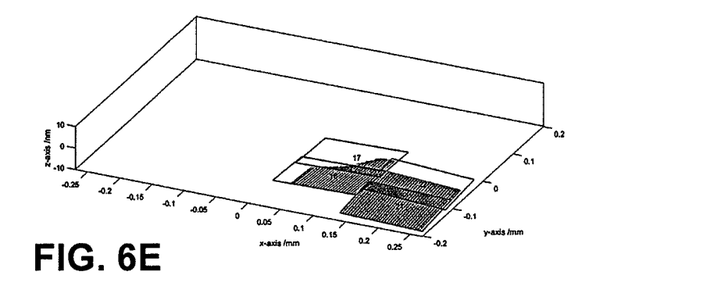
FIGS. 6E and 6F illustrate a result of stitching measured height maps to a sub-composite height map in a third set of measured height maps.
Figure 6F:
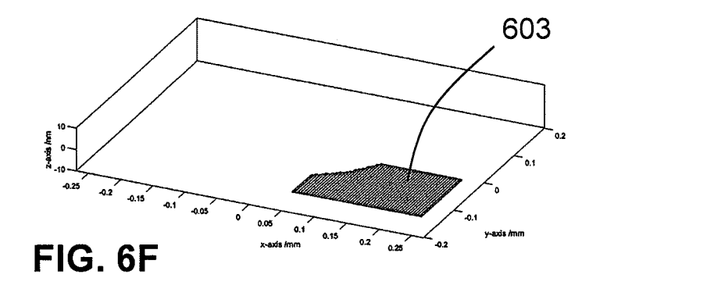
Figure 6G:
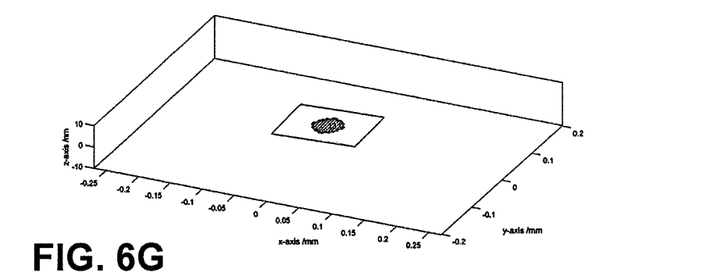
FIGS. 6G and 6H illustrate a result of processing a measured height map to a sub-composite height map in a fourth set of measured height maps.
Figure 6H:
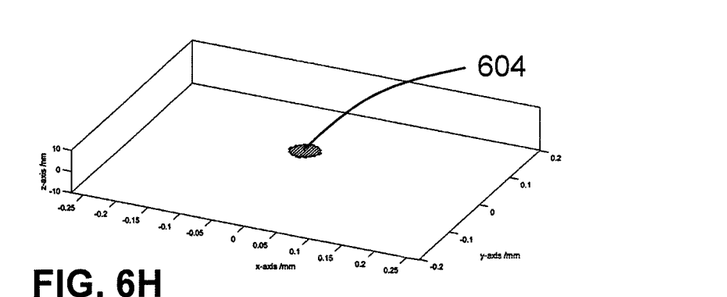

FIG. 6A depicts the height maps of set I, whereas FIG. 6B depicts a result of stitching, within set I, the measured height maps to a sub-composite stitched height map 601. FIG. 6C depicts the height maps of set II, whereas FIG. 6D depicts a result of stitching, within set II, the measured height maps to a sub-composite stitched height map 602. FIG. 6E depicts the height maps of set III, whereas FIG. 6F depicts a result of stitching, within set III, the measured height maps to a sub-composite stitched height map 603. FIG. 6G depicts the height map of set IV, whereas FIG. 6H depicts a result of stitching, within set IV, the measured height map to a sub-composite stitched height map 604. In fact, for set IV including only one height map, a stitching can be dispensed with, although a correction of tilt and offset errors may be required.

Figure 7:
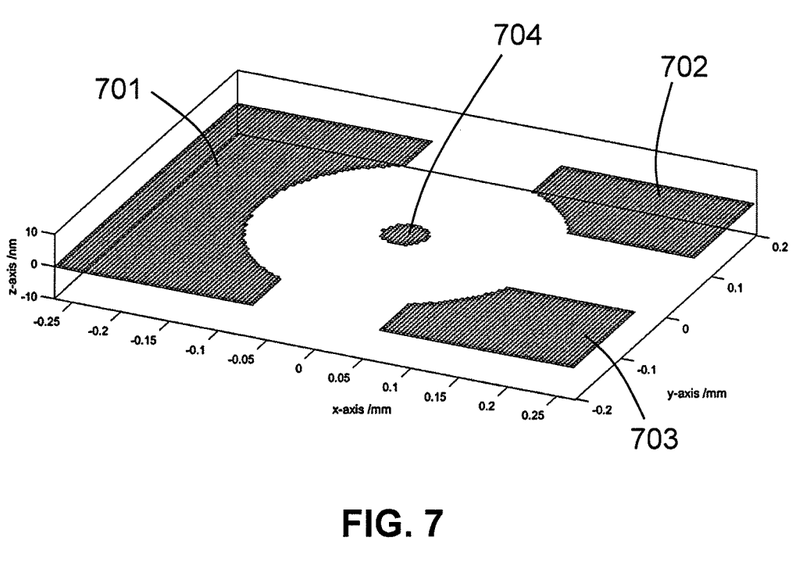
FIG. 7 illustrates a result of combining the sub-composite stitched height maps to a composite height map.

FIG. 7 depicts a result of combining the sub-composite stitched height maps 601, 602, 603 and 604 to a composite height map including height maps 701, 702, 703 and 703 respectively computed from height maps 601, 602, 603 and 603, for example using pre-scan or post-scan results.

As explained in detail above, in a method and system for measuring a height map of a surface of an object, the following steps are carried out. Height maps of different sections of the surface of the object are measured, using an optical profilometer having a field of view, FOV, covering an individual section, wherein each height map includes height data. The measured height maps are grouped into different sets of height maps, wherein within each set each one of the height maps of the set has a valid overlap to at least one other height map of the set, and wherein each height map belongs to one set and does not have a valid overlap with any height map of another set. Within each set, the measured height maps are stitched to a sub-composite stitched height map. The sub-composite stitched height maps are combined to a composite height map.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a"/"an", as used herein, are defined as one or more than one. The term plurality, as used herein, is defined as two or more than two. The term another, as used herein, is defined as at least a second or more. The terms including and/or having, as used herein, are defined as including (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or other unit may fulfil the functions of several items recited in the claims.

The terms computer program and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system, in particular in a processing unit thereof.

A computer program may be stored and/or distributed on a suitable non-volatile medium, such as an optical storage medium or a solid-state medium supplied together with or as part of other hardware, but also be distributed in other forms, such as via the Internet or other wired or wireless telecommunication systems.

What is claimed is:

1. A method of measuring a height map of a surface of an object, the method comprising:
    measuring height maps of different sections of the surface of the object, using an optical profilometer having a field of view covering an individual section, wherein each section includes grid positions, and wherein each height map includes height data at the grid positions of the corresponding section;
    grouping the measured height maps into different sets of height maps, wherein:
        within each set, each one of the height maps of the set has a valid overlap to at least one other height map of the set, and
        each height map belongs to one set and does not have a valid overlap with any height map of another set; and
    stitching, within each set, the measured height maps to a sub-composite stitched height map, wherein
    if only a height offset between overlapping height maps is to be corrected by the stitching of the height maps within each set to a sub-composite stitched height map, a valid overlap occurs if at at least one grid position common to the overlapping height maps valid height data exist in each one of the overlapping height maps, and
    if a height offset and tilt errors between overlapping height maps are to be corrected by the stitching of the height maps within each set to a sub-composite stitched height map, a valid overlap occurs if at at least three different grid positions common to the overlapping height maps valid height data exist in each one of the overlapping height maps.

2. The method according to claim 1, further comprising, after the stitching, combining the sub-composite stitched height maps to a composite height map.

3. The method according to claim 1, wherein the grouping the measured height maps into different sets of height maps comprises minimizing the number of sets.

4. The method according to claim 1, wherein the grouping the measured height maps into different sets of height maps comprises:
    (a) indexing all measured height maps by associating each measured height map with an index;
    (b) generating, for each one of the measured height maps, a list of indices associated with other measured height maps sharing a valid overlap with said each one of the height maps;
    (c) selecting a measured height map;
    (d) comparing each index of the list of indices of the selected measured height map with the indices of the lists of indices of all other measured height maps;
    (e) if a match between one of the indices of the list of indices of the selected measured height map and one or the indices of a list of indices of another measured height map is found, then merging the list of indices of said other measured height map with the list of indices of the selected measured height map, and discarding the list of indices of said other measured height map;
    (f) searching, in the merged list of indices, an index occurring more than once;
    (g) if an index occurring more than once is identified in the merged list of indices, then retaining one occurrence of the index in the merged list of indices and discarding all other occurrences of the index from the merged list of indices to obtain a condensed merged list of indices; and (h) repeating (c) to (g) for all remaining measured height maps, wherein each remaining list of indices represents one of the sets of height maps.

5. The method according to claim 1, further comprising compensating height offsets between sub-composite stitched height maps, based on temperature drift model data to estimate drift based on environment temperature.

6. The method according to claim 1, further comprising compensating height offsets between sub-composite stitched height maps, based on at least one pre-scan or post-scan height map.

7. The method according to claim 6, wherein the pre-scan height map includes Computer Aided Design data.

8. The method according to claim 6, wherein one of the pre-scan or post-scan height map comprises height data measured by at least one of:

an optical sensor having a field of view which is larger than a gap between sub-composite stitched height maps; or a tactile sensor configured to contact each section of the surface of the object at least at one location.

9. The method according to claim 6, further comprising:

computing data points of the pre-scan or post-scan height map that have an overlap to each of the sub-composite stitched height maps;

computing a first mean of height data of each sub-composite stitched height map;

computing a second mean of the corresponding overlapping height data in the pre-scan or post-scan height map;

computing an offset of each sub-composite stitched height map by subtracting the first mean from the second mean; and subtracting, for each sub-composite stitched height map, its corresponding offset from the height data of the sub-composite stitched height map before combining the sub-composite stitched height maps to a composite height map.

10. The method according to claim 6, further comprising:

interpolating data points of the sub-composite stitched height maps to grid positions of the pre-scan or post-scan height map;

computing data points of the pre-scan or post-scan height map that have an overlap to each of the interpolated sub-composite stitched height maps;

computing a first mean of height data of each interpolated sub-composite stitched height map;

computing a second mean of the corresponding overlapping height data in the pre-scan or post-scan height map;

computing an offset of each interpolated sub-composite stitched height map by subtracting the first mean from the second mean; and subtracting, for each sub-composite stitched height map or interpolated sub-composite stitched height map, its corresponding offset from the height data of the sub-composite stitched height map or interpolated sub-composite stitched height map, before combining the sub-composite stitched height maps or interpolated sub-composite stitched height maps to a composite height map.

11. The method according to claim 9, wherein the offset subtracting is performed only when a value based on at least one of a number of fields of view in each set of height maps, the data density in one field of view, and a point-to-point uncertainty, is larger than a predetermined threshold.

12. The method according to claim 1, further comprising, if the absolute height data of the surface are lost, restoring the absolute height data of the surface by:

fitting a first plane to the sub-composite stitched height maps;

subtracting the first fitted plane from the sub-composite stitched height maps;

fitting a second plane to corresponding measured height data; and adding the second fitted plane to the sub-composite stitched height maps.

13. The method according to claim 12, wherein the fitting the first plane comprises using a subset of the measured height data, wherein the subset includes height data at a centre of the fields of view.

14. The method according to claim 12, wherein the fitting the first plane comprises using a mean per corresponding fields of view.

15. The method according to claim 1, further comprising establishing a common grid for an individual section, for a set of height maps, for a sub-composite stitched height map, for a composite height map, or for the surface, by:

calculating an average pixel size in X and Y directions;

calculating an average field of view size in X and Y directions;

calculating an average field step size in X and Y directions from the average pixel size and the average field of view size; and generating a common X-Y grid for interpolation of all height data.

16. The method according to claim 15, wherein the field step size is pseudo-random.

17. A system for measuring a height map of a surface area of an object, the system comprising:

a memory configured to store height data of measured height maps of different sections of the surface of the object, each section including grid positions, and each height map including height data at the grid positions of the corresponding section; and a processor configured to perform operations comprising:

retrieving the height data of the measured height maps from the memory;

grouping the measured height maps into different sets of height maps, wherein within each set each one of the height maps of the set has a valid overlap to at least one other height map of the set, and wherein each height map belongs to one set and does not have a valid overlap with any height map of another set; and stitching, within each set, the measured height maps to a sub-composite stitched height map, wherein if only a height offset between overlapping height maps is to be corrected by the stitching of the height maps within each set to a sub-composite stitched height map, a valid overlap occurs if at at least one grid position common to the overlapping height maps valid height data exist in each one of the overlapping height maps, and if a height offset and tilt errors between overlapping height maps are to be corrected by the stitching of the height maps within each set to a sub-composite stitched height map, a valid overlap occurs if at at least three different grid positions common to the overlapping height maps valid height data exist in each one of the overlapping height maps.

18. The system according to claim 17, further comprising:
at least one optical profilometer having a field of view, the profilometer being configured to measure height maps of different sections of the surface of the object, the field of view covering an individual section, wherein each height map comprises height data.

19. The system according to claim 17, wherein the processor is further configured to perform operations further comprising combining the sub-composite stitched height maps to a composite height map.

20. The system according to claim 17, wherein the processor is further configured to perform operations further comprising:
(a) indexing all measured height maps by associating each measured height map with an index;
(b) generating, for each one of the measured height maps, a list of indices associated with other measured height maps sharing a valid overlap with said each one of the height maps;
(c) selecting a measured height map;
(d) comparing each index of the list of indices of the selected measured height map with the indices of the lists of indices of all other measured height maps;
(e) if a match between one of the indices of the list of indices of the selected measured height map and one or the indices of a list of indices of another measured height map is found, then merging the list of indices of said other measured height map with the list of indices of the selected measured height map, and discarding the list of indices of said other measured height map;
(f) identifying, in the merged list of indices, an index occurring more than once;
(g) if an index occurring more than once is identified in the merged list of indices, then retaining one occurrence of the index in the merged list of indices and discarding all other occurrences of the index from the merged list of indices to obtain a condensed merged list of indices; and
(h) repeating (c) to (g) for all remaining measured height maps,
wherein each remaining list of indices represents one of the sets of height maps.

21. The system according to claim 17, wherein the processor is further configured to perform operations further comprising outputting calculated height data to at least one of:
a display that displays each sub-composite stitched height map;
a memory configured to store the height data of the sub-composite stitched height map; or
a printer configured to print each sub-composite stitched height map.

22. At least one tangible, non-transitory computer-readable medium storing an executable set of instructions for measuring height maps of different sections of the surface of the object, using an optical profilometer having a field of view covering an individual section, wherein each section includes grid positions, wherein each height map includes height data at the grid positions of the corresponding section, wherein the set of instructions, when executed by a computer processor, causes the computer processor to execute operations comprising:
grouping the measured height maps into different groups of height maps, wherein:
within each group, each one of the height maps of the group has a valid overlap to at least one other height map of the group, and
each height map belongs to one group and does not have a valid overlap with any height map of another group, wherein
if only a height offset between overlapping height maps is to be corrected by the stitching of the height maps within each set to a sub-composite stitched height map, a valid overlap occurs if at at least one grid position common to the overlapping height maps valid height data exist in each one of the overlapping height maps, and
if a height offset and tilt errors between overlapping height maps are to be corrected by the stitching of the height maps within each set to a sub-composite stitched height map, a valid overlap occurs if at at least three different grid positions common to the overlapping height maps valid height data exist in each one of the overlapping height maps.

* * * * *

UNITED STATES PATENT AND TRADEMARK OFFICE
CERTIFICATE OF CORRECTION

| | |
|---|---|
| PATENT NO. | : 11,466,976 B2 |
| APPLICATION NO. | : 16/247765 |
| DATED | : October 11, 2022 |
| INVENTOR(S) | : J. Quaedackers |

It is certified that error appears in the above-identified patent and that said Letters Patent is hereby corrected as shown below:

In the Claims

Column 14, Line 57 (Claim 4, Line 15), please change "one or" to -- one of --.
Column 17, Line 28 (Claim 20, Line 15), please change "one or" to -- one of --.

Signed and Sealed this
Twenty-eighth Day of February, 2023

*Katherine Kelly Vidal*

Katherine Kelly Vidal
*Director of the United States Patent and Trademark Office*